Figure 1:
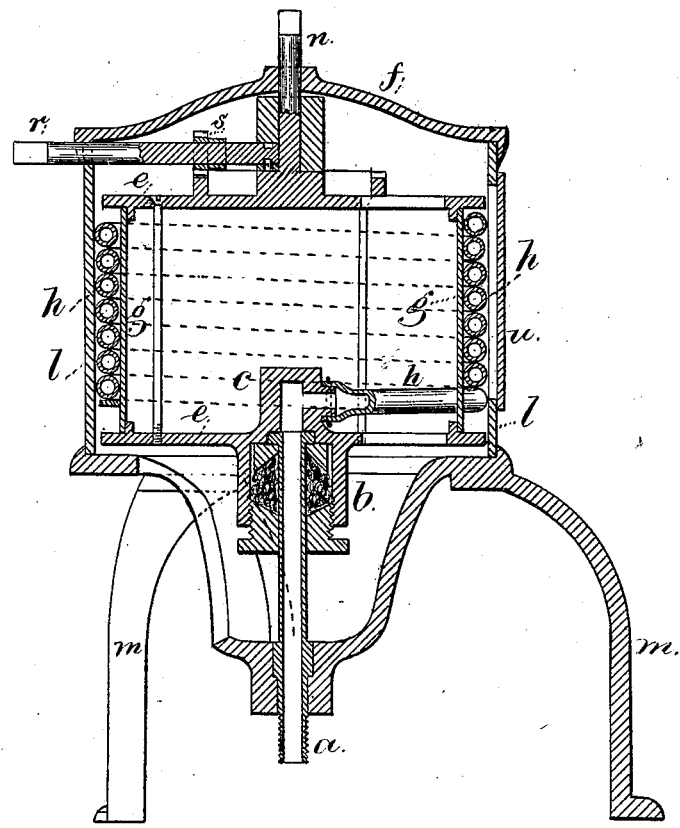
Figure 2:
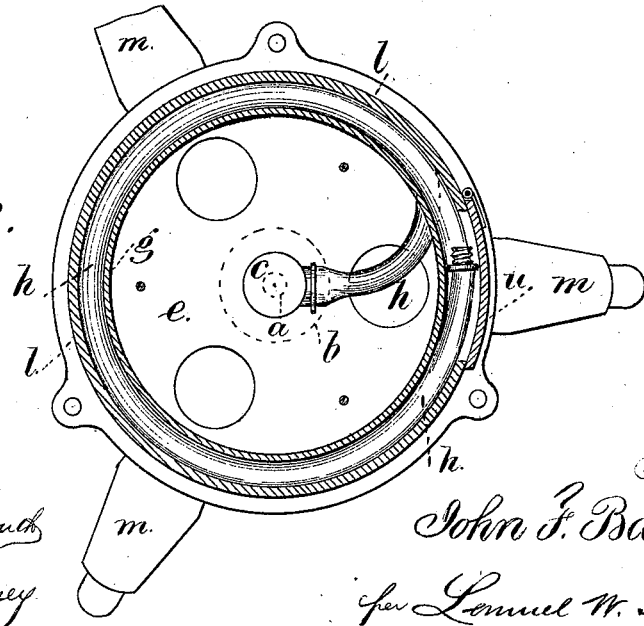

J. F. BARTLETT.
HOSE-REEL.

No. 177,367. Patented May 16, 1876.

Witnesses
Chas H Smith
Geo. P Pinckney

Inventor
John F. Bartlett
per Lemuel W. Serrell
atty.

UNITED STATES PATENT OFFICE.

JOHN F. BARTLETT, OF WINSTED, CONNECTICUT.

IMPROVEMENT IN HOSE-REELS.

Specification forming part of Letters Patent No. 177,367, dated May 16, 1876; application filed February 14, 1876.

*To all whom it may concern:*

Be it known that I, JOHN FRANKLIN BARTLETT, of Winsted, in the county of Litchfield and State of Connecticut, have invented an Improvement in Reels for Hose, of which the following is a specification:

Reels have been made with a tubular axis, upon which has been wound the hose, and there has been a lateral branch from the tubular axis to the hose. In all cases these tubular axes have been horizontal, or nearly so, and the water could not run out of the hose when the supply is shut off.

My invention relates to a reel upon a vertical spindle, with a tube extending from a vertical shaft, and coupling below the center of the reel to the hose that is wound upon such reel, the parts being constructed so that the hose is wound from the lower part of the reel upward in a regular helical form, and hence any water that remains in the hose will run out when the supply is shut off and a wasteway opened.

The pipe $a$ extends to any desired water-supply. Around the end thereof is the packing-gland or stuffing-box $b$—that is, upon the bent or angular pipe $c$.

The reel is made with the top and bottom heads $e$ and $f$, and with an open or closed cylindrical portion, $g$, and the head $e$ is connected to the pipe $c$ and gland $b$, so as to cause the reel and pipe $c$ to revolve together around the stationary pipe $a$ whenever the hose is wound upon or drawn off the reel.

The hose $h$ is of india-rubber or other suitable material, and should be provided with a nozzle, and the inner end of that hose is connected with the pipe $c$, so that there is always a communication open through the pipes $a$ and $c$ with the hose, and the water can be flowing through the hose while the reel is being revolved. Usually the reel will be placed in a case, $l$, upon a stand or legs, $m$, and the upper head $f$ will be provided with the central shaft $n$ and crank-handle, or else the reel may be revolved by the shaft $r$ and pinion $s$ gearing into a wheel at the top of the reel. If the case $l$ is a closed one, a door, $u$, will be required at one side to give access in drawing off or winding up the hose.

I claim as my invention—

The hose-reel upon a vertical shaft, with a supply-tube and coupling connected to the lower end of the shaft, in combination with a pipe extending from the said central shaft to the surface of the reel, and the hose wound upon such reel, substantially as and for the purposes set forth.

Signed by me this 7th day of February, A. D. 1876.

JOHN F. BARTLETT.

Witnesses:
WILBUR S. WATSON,
WILLIE J. WOODWARD.